May 10, 1966  F. M. LOZANO  3,250,130
LIQUID SAMPLER
Filed Dec. 2, 1963
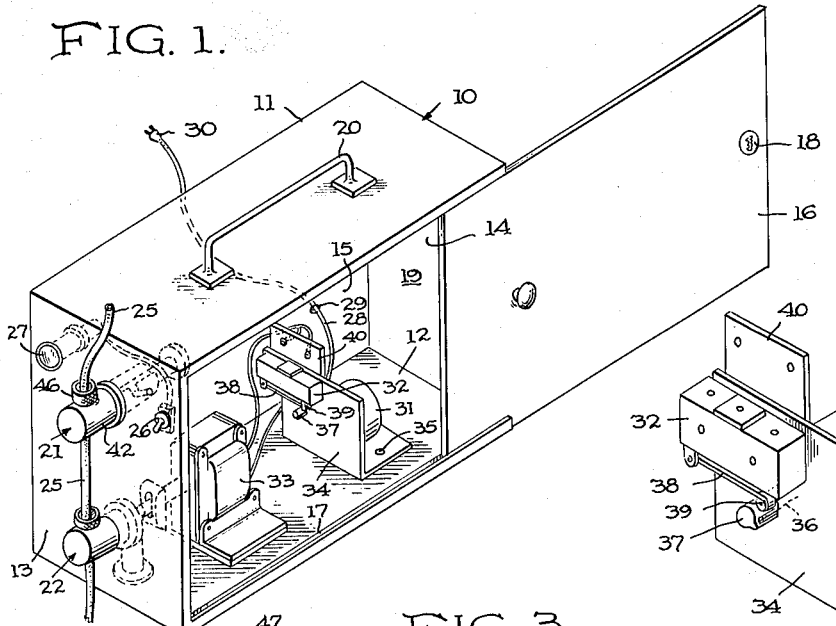
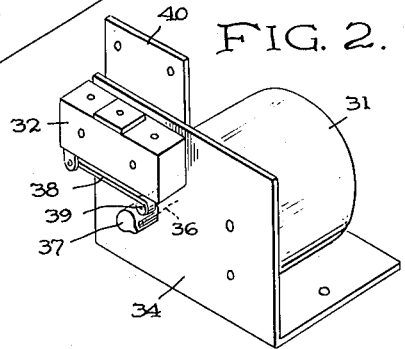
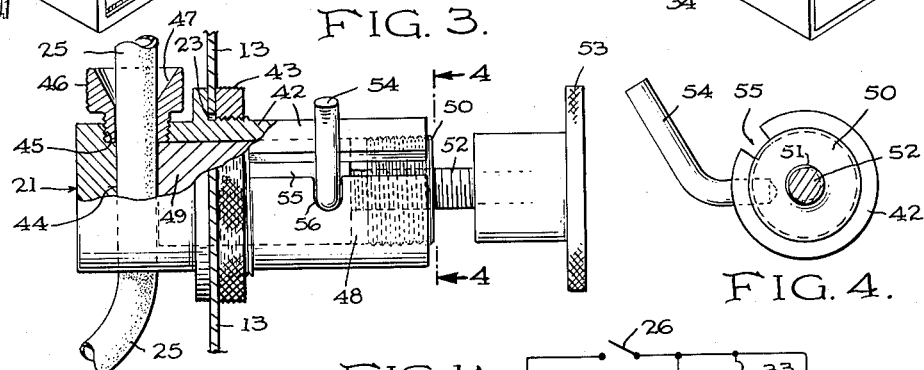
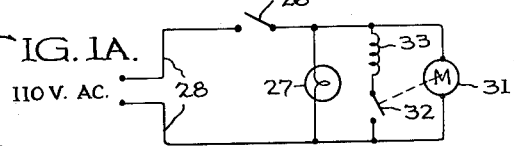
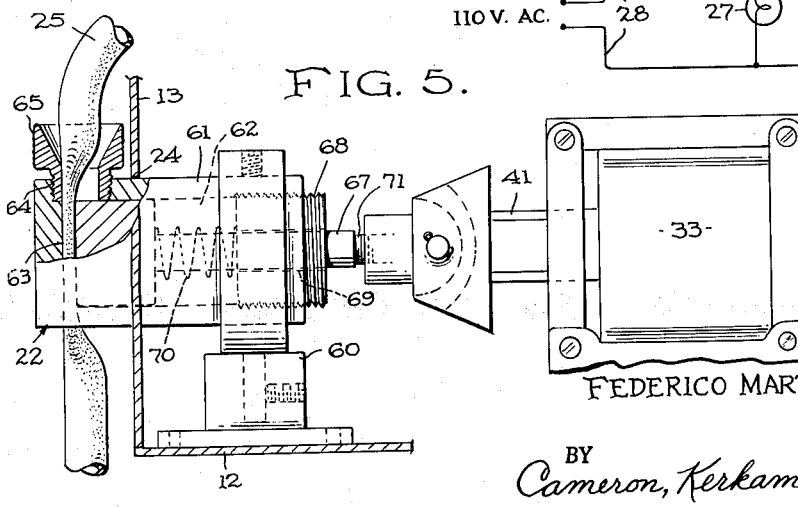
INVENTOR
FEDERICO MARTINEZ LOZANO
BY Cameron, Kerkam & Sutton
ATTORNEYS

United States Patent Office 3,250,130
Patented May 10, 1966

3,250,130
LIQUID SAMPLER
Federico Martinez Lozano, 340 N. Martinez de Zavala, Monterrey, Nuevo Leon, Mexico
Filed Dec. 2, 1963, Ser. No. 327,267
9 Claims. (Cl. 73—422)

This application relates generally to sampling devices and more particularly to an automatic liquid sampler for collecting predetermined volumes of liquid samples.

Various processes often require the sampling of liquid mixtures during various stages of the process in order to maintain an accurate control of the process, while in some processes, it is often required to control the volume of several necessary ingredients which are periodically injected. Very often, when measuring minute predetermined quantities of liquid samples or when injecting predetermined quantities of ingredients, resort is made to a manual measurement of the quantities of liquid. Such arrangements, in addition to being subject to human error, require the use of skilled personnel and the use of highly accurate and expensive equipment. In addition, manual control of such processes requires the personnel to be alert at all times, since these processes are usually continuous and the failure to sample or inject at the correct time may result in the inferior and sometimes unusable products.

In the present invention, the above mentioned inadequacies are overcome and provision is made for automatically sampling or injecting a predetermined volume of liquid. The volume of each sample taken or injected is precisely controlled so that each quantity sampled or injected is exactly the same thereby establishing an accurate quality control during the process.

Accordingly, it is an object of this invention to provide a novel liquid sampler.

Another object of the present invention is to provide a novel automatic liquid sampler which will sample or inject precise quantities of liquid.

A further object of this invention is to provide a novel automatic liquid sampler or injector which is simple in operation and inexpensive to manufacture.

In carrying out the invention, in one form thereof, there is provided a completely automatic liquid sampling device which may be used to collect or inject a quantity of liquid. The liquid to be sampled is transmitted by means of a suitable conduit under the control of a volume control valve which is adjusted to control the volume of liquid flow through the conduit. The liquid flow is further controlled by a timing mechanism which is selectively energized in a predetermined time sequence to allow the passage of the liquid to a collecting means for a predetermined period of time. The timing mechanism, when energized, is continuously operated so as to regulate the number of times the sample is collected.

While the specification concludes with claims particularly pointing out and distinctly claiming the subject matter regarding the invention, it is believed the invention will be better understood from the following description taken in connection with the accompanying drawings where like reference characters indicate like parts.

FIG. 1 is a perspective view of the liquid measuring device of the present invention;

FIG. 1a is a schematic diagram of the electrical circuit of the present invention;

FIG. 2 is a perspective view of the timing mechanism;

FIG. 3 is a side elevational view, partly in cross section, of the volume control valve;

FIG. 4 is an end elevational view, partly in cross section, of the volume control valve of FIG. 2 taken along lines 4—4; and FIG. 5 is a side elevational view, partly in cross section, of the solenoid operated time control valve.

Referring now to the drawing, and in particular to FIG. 1, the liquid sampler of the present invention comprises a portable support housing 10. Housing 10 may be formed of any suitable material such as, for example, aluminum, steel, wood or the like and comprises top and bottom walls 11 and 12, respectively, end walls 13 and 14, back wall 15 and front wall or door 16. One of the walls may be arranged to provide access within the housing, and to this end, top and bottom walls 11 and 12 are grooved as at 17 adjacent their front end. Front wall 16 is supported within the grooves for sliding engagement to provide a sliding door. If desired the sliding door 16 may be provided with a lock 18 to prevent unauthorized access into the compartment 19 to insure that the settings of controls within the compartment 19 remain unchanged and under the control of the operator.

The liquid sampler of the present invention, due to its compact nature, may be easily transported from station to station. To this end, top wall 11 has affixed thereto a handle 20; however, it should be readily apparent that the sampler is equally well adapted for permanent installation and may be provided in such case with brackets (not shown) affixed to the end walls 13 and 14 or any of the other enclosing wall members.

Supported on end wall 13 are a pair of valves 21 and 22 which extend through suitable apertures 23 and 24, respectively, in end wall 13. Valve 21 is a volume regulator valve and has extending therethrough a supply conduit or hose 25 which has one end connected to a source of liquid which is to be sampled by a conventional coupling (not shown) provided thereon. The other end of supply conduit 25 extends through valve 22 which controls the time of flow through the conduit 25 and is arranged to empty its contents into a suitable container (not shown).

End wall 13 may have located thereon a conventional single pole, single throw operating switch 26 connected to a source of power, and an indicating lamp 27 for providing a visual indication of the energization of the liquid sampler. Electrical connection from the power source, which may be a conventional 110 v. A.C. power source, to the switch 26 and control components within the compartment 19 is established by suitable wiring 28 extending through a grommeted aperture 29 in one of the walls, such as back wall 15 to the A.C. plug 30.

Referring to FIG. 1a, the electrical circuit diagram of the present invention is illustrated. Operating switch 26, which is normally open, is serially connected in one line of the power input wiring 28 and, when closed, establishes the circuit for indicating lamp 27 and motor 31 connected in parallel. Motor 31 drives a cam element 37 (FIG. 2) which actuates a normally open microswitch 32 serially connected to a solenoid operating coil 33. Switch 32 and solenoid operating coil 33 are serially connected across the input power lines so that closing of microswitch 32 by the action of the motor driven cam element 37 causes a corresponding energization of the solenoid operating coil 33.

Motor 31 is arranged within compartment 19 and is supported by bracket 34 affixed in any suitable manner, such as by screws 35 to the bottom wall or base 12. Motor 31 drives a speed reducer (not shown) also supported by bracket 34 to extablish the desired timing control for the present invention. In the preferred embodiment, the speed reducer, having its shaft 36 extending through bracket 34, provides a one revolution per minute timing movement to a cam element 37 (more clearly shown in FIG. 2) affixed to shaft 36. Cam element 37, as illustrated, is a cylindrical-like element having an extending protrusion which controls the time of actuation of the microswitch 32. However, it should be readily apparent, that the shape of cam element 37 may be varied as desired to provide any desired timing operation. For example, cam element 37 may take the shape of a disc mounted on the shaft and having its periphery predeterminedly contoured to provide a greater or lesser time of contact with the actuating element of microswitch 32 or to provide energization of microswitch more than one per revolution. Also, the gearing of the speed reduction unit may be varied as desired to provide a reduction of speed other than to one revolution per minute, depending on the particular requirements of the installation.

Microswitch 32, having a conventional snap action, comprises normally open contacts, and is affixed in any suitable manner at one end of bracket 34. Microswitch 32 is arranged with an extending lever arm 38 connected at one end for actuation of the contacts in a conventional manner and has a roller 39 at its free end. Roller 39 is position to be in contact with cam element 37. Upon rotation of shaft 36, cam element 37 engages the roller 39 causing the free end of lever arm 38 to raise thus actuating the snap action elements of microswitch 32 to close its contacts. For convenience, a terminal board 40 may be affixed to bracket 34 to establish electrical connection between the power source, microswitch 32, motor 31 and other components within the housing.

Actuation of microswitch 32 energizes the operating coil of a solenoid 33 mounted on base 11. Solenoid 33 is conventional and comprises a plunger or armature 41 which is extended in the deenergized position of the solenoid. In its deenergized position, armature 41 acts on valve 22 so as to prevent the flow of fluid through the conduit 25. Upon energization of solenoid 33, the arm is retracted and conduit 25 opened to allow free flow of fluid to take place, which free flow is maintained in accordance with the energization of the solenoid 33 controlled by the timing means comprising the cam 37, the speed reducer and motor 31.

Referring to FIGS. 3 and 4, there is shown the flow control regulating valve 21 of the present invention. Valve 21 comprises a cylindrical body 42 extending through end wall 13 and secured thereto by means of nut 43. That portion of the body 42 extending externally of end wall 13 is provided with a passageway 44 threaded at one end as at 45. A suitable coupling 46 is provided in threaded engagement therewith and comprises a conical bore portion 47 which allows conduit 25 to be guided therethrough for insertion through the passageway 44.

In the preferred embodiment of the present invention, conduit 25 is made of a continuous length of deformable material which may be, for example, plastic or rubber type material, which extends from the source of liquid to be sampled through valves 21 and 22 to the collecting area. However, it should be apparent that conduit 25 may also be formed in sections from materials such as copper, aluminum or the like. In such an arrangement, the body 42 of valve 21 is threaded at opposite ends of the passageway 44. Suitable coupling connections are provided to connect the conduit 25 to the inlet and outlet of the passageway 44 and the valve is suitably sealed by O rings or the like so that the entire passageway within a body 42 is leakproof.

As shown in FIG. 3, body 42 of valve 21 is provided with a central bore 48 within which extends piston 49. One end of bore 48 is threaded and adapted to receive an insert 50 having a central bore 51 through which threaded shaft 52 extends. Shaft 52 is affixed at one end to piston 49 and is provided at its other end with a thumb and finger wheel 53. Thus, rotation of the thumb and finger wheel 53 results in a reciprocal movement of the piston 49 moving the piston axially into the area of the passageway 44. Continued rotation of the thumb and finger wheel causes piston 49 to squeeze or pinch the conduit 25 passing through the passageway 44 to control the quantity of liquid passing through the hose.

For locking the piston member in its open position, which allows for flushing of the conduit 25, piston 49 is provided with an extending lever arm 54. Body member 42 is slotted or grooved axially along its peripheral surface as at 55 to allow backward and forward movement of the lever. A locking slot 56 extends from the groove 55 along the circumference of body member 42 and approximately at right angles to the groove 55 to permit the piston to be retracted and maintained in a locked position by a lever action. The lever 49, when positioned in the groove 55, allows the piston 49 to be under the control of the thumb and finger wheel 53, and when maintained in the slot 56 prevents reciprocal movement of the piston 49 while maintaining passageway 44 open.

Referring to FIG. 5, there is shown the time regulator valve 22 which controls the period of free flow of liquid therethrough. Valve 22 extends through aperture 24 and end wall 13 and is supported by means of standard 60 located within the compartment and mounted on base 12. Valve 22 comprises a body 61 having a central bore 62 therein. That portion of the body 61 extending externally of the end wall 13 is provided with a passageway 63 threaded at one end as at 64 and arranged to receive therein the conduit 25. A coupling member 65 is provided in threaded engagement with the threaded recess 64. The coupling member is similar to that shown in connection with FIG. 2 and is provided with a conical bore for aiding the insertion of conduit 25 through the valve passageway 63.

Located within bore 61 is a piston member 66 affixed to shaft 67. One end of bore 61 is threaded and arranged to receive in threaded engagement therewith a threaded insert having a central bore 69 through which the shaft 67 extends. A compression spring 70 is positioned around shaft 67 within the bore 62 and serves to aid in maintaining piston 65 tight against the conduit 25 in its extended position thus positively closing off the flow of fluid. Compression spring 70 is desirable to take up play which may exist between the connection of solenoid armature 41 and the shaft 67 of the valve 22. Shaft 67 may be provided with a threaded extension 71 which is threaded into the armature 41 of the solenoid 33.

Energization of solenoid 33 causes its armature 41 to retract thus pulling piston 66 into the bore 62 to allow free flow of the liquid through the conduits. In the deenergized condition of the solenoid 33, armature 41 is in its extended position and piston 66 closes in on conduit 25 thus pinching or contracting the conduit 25, as shown in FIG 5, to prevent any fluid flow therethrough. The opening and closing of armature 41 of solenoid 33 is controlled in the manner hereinbefore described by the operation of timing cam element 37.

In operation, conduit 25 is connected at its input end to a source of liquid to be sampled. The conduit passes through the volume control valve 21 which is adjusted by means of the thumb and finger wheel 53 forcing piston 49 inwardly to pinch or squeeze the conduit 25 and thus regulate the volume of liquid passing through the conduit. The conduit 25 continues through valve 21 and then through the time control valve 22. Time control valve is an open and shut valve which is normally shut and opened by the energization of solenoid 33. Solenoid 33 is energized by the actuation of microswitch 32 under the control of a timing cam element 37 affixed to the shaft of a speed reducing drive mechanism driven by motor 31. The time control valve 22 in conjunction with the timing mechanism regulates the number of times a sample is taken within a predetermined period such as, for example, a minute or an hour. This timing can be changed by adjusting the contour of the cam 27 or by changing the number of revolutions provided by the speed reducer for one revolution of the motor.

Although the present invention has been described primarily in conjunction with a liquid sampler, it can be readily appreciated that the invention can be utilized equally as well for injection of predetermined quantities of liquid in which case the inlet of conduit 25 is connected to the liquid source which is to be injected. The volume control valve 21 and timing control mechanism are set as required and the outlet end of conduit 25 is connected to the area where the liquid is to be injected. Such a system is readily adaptable for operation under varying pressure conditions for sampling or injecting precise quantities of liquid.

Although the invention and its operation has been described with reference to specific embodiments, many modifications may be made and it is intended by the appended claims to cover all such modifications which fall within the true spirit and scope of the invention.

What is claimed is:

1. A liquid sampler comprising a deformable hose arranged to have its inlet end connected to a source of liquid to be sampled and its outlet end connected to a predetermined location for receiving the sampled liquid, first valve means, said first valve means including a body member having a passageway in communication with the inlet end of said hose, a central bore, a piston supported within said bore arranged for reciprocal movement therein and manual adjusting means connected to said piston for imparting to said piston said reciprocal movement for restricting the opening of said passageway, timing means arranged to be energized from a source of power, said timing means including second valve means having a body member provided with a passageway in communication with the outlet end of said hose, means for supporting said first valve means and timing means, means connecting the passageways of said first and second valve means to allow fluid flow therebetween, said passageway of said first valve means being formed by said deformable hose extending through the body member, said piston being arranged upon reciprocal movement to contact and deform said hose to thereby restrict said deformable hose and control the volume of fluid flow therethrough, said second valve means being arranged to automatically maintain its passageway open or closed in response to the energization of the timing means and thereby control the period of flow of the liquid through said hose, said body member of said first valve means further including a groove extending axially along the periphery of said body member, a slot on the peripheral surface of said body member extending approximately at a right angle from said groove, a lever affixed to the piston of said first valve means and said lever being arranged for movement in said groove and positioning in said slot, the passageway of said first valve means being fully open when said lever is positioned in said slot.

2. A liquid sampler comprising conduit means arranged to have an inlet end connected to a source of liquid to be sampled and its outlet end connected to a predetermined location for receiving the sampled liquid, first valve means, said first valve means including a body member having a central bore, a piston supported in said bore and a groove extending axially along the periphery of said body member, a slot on the peripheral surface of said body member extending approximately at a right angle from said groove, a lever affixed to the piston of said first valve means, said lever being arranged for movement in said groove and positioned in said slot, the passageway of said first valve means being fully open when said lever is positioned in said slot, said conduit means being arranged to extend through said body member, said piston being arranged for reciprocal movement therein, adjusting means connected to said piston for imparting said reciprocal movement thereto for restricting the opening of said conduit means extending through said body member to thereby control the volume of fluid flow through said conduit, timing means arranged to be energized from a source of power, means for supporting said first valve means and timing means, said timing means including second valve means having a body member, said conduit means being arranged to extend through the body member of second valve means, said last named body member having a central bore and a piston supported therein, said last named piston being arranged for reciprocal movement under the control of said timing means to open or close said conduit means extending through the body member of said second valve means to control the period of flow of fluid through said conduit means.

3. The liquid sampler as set forth in claim 1 wherein the body member of said second valve means includes a central bore, a piston supported within said bore and arranged for reciprocal movement therein to open or close the passageway of said second valve means.

4. The liquid sampler as set forth in claim 3 wherein said passageway of said second valve means is formed by said deformable hose extending through the body member of said second valve means, and said piston being arranged upon reciprocal movement to contact and squeeze said hose for opening or closing the deformable hose to control the period of flow therethrough.

5. The liquid sampler as set forth in claim 4 wherein said timing means further includes a solenoid connected to the piston of said second valve means and arranged to impart said reciprocal motion to said piston and a motor driven cam element for energizing said solenoid in a predetermined timing sequence.

6. The liquid sampler as set forth in claim 2 wherein said timing means further includes a switch, a cam element for actuating said switch, motive means for driving said cam element and means connecting said solenoid to the source of power through said switch to energize said solenoid in response to the actuation of said switch by said cam element.

7. An automatic portable liquid sampler comprising a housing have a base and enclosing wall members, first valve means mounted on one of said wall members, said first valve means including a body member having a central bore and a piston supported therein, said piston being arranged for reciprocal movement, adjusting means connected to said piston for imparting reciprocal movement thereto, second valve means mounted on one of said wall members, said second valve means including a body member having a central bore and a piston supported therein, said piston being arranged for reciprocal movement, said body members of said first and second valve means extending through the enclosing wall members and having an inlet and an outlet, respectively, in communication with their respective bores, a continuous length of deformable hose having an inlet end arranged to be connected to a source of liquid to be sampled and an outlet end connected to a predetermined location for receiving the sampled liquid, said deformable hose being outside of said enclosing wall members and extending serially through the inlet and outlet of the body members of said first and second valve means, the piston of said first valve means being arranged for deforming the hose and restricting the passage of fluid through said deformable hose in response to said adjusting means, the piston of said second valve means being arranged for deforming the hose and stopping the passage of fluid therethrough and means within said enclosing wall members for automatically actuating said second valve means in a predetermined timing sequence to allow free flow of said fluid.

8. The liquid sampler as set forth in claim 7 further including a solenoid mounted on said base within said enclosing wall members, said solenoid being connected to said piston and arranged to actuate said piston upon energization of said solenoid, a switch, means for supporting said switch, means electrically connecting said solenoid to a source of power through said switch, and timing means for actuation of said switch in said predetermined timing sequence.

9. The liquid sampler as set forth in claim 8 further includes a lever on said switch arranged to actuate said switch upon movement of said lever, a cam element for moving of said lever, said cam element being contoured to provide said predetermined timing sequence and mounted on the shaft of motor supported on said base and means electrically connecting said motor to a source of power.

References Cited by the Examiner

UNITED STATES PATENTS

| | | | |
|---|---|---|---|
| 1,855,323 | 4/1932 | Sirch | 251—8 X |
| 2,245,679 | 6/1947 | Kelly | 73—422 X |
| 2,489,394 | 11/1949 | Austin | 73—422 X |
| 2,674,435 | 4/1954 | Angell | 251—7 |

DAVID SCHONBERG, *Primary Examiner.*

LOUIS R. PRINCE, *Examiner.*

S. C. SWISHER, *Assistant Examiner.*